United States Patent
Teranishi et al.

(10) Patent No.: US 6,304,734 B1
(45) Date of Patent: Oct. 16, 2001

(54) IMAGE FORMING APPARATUS FOR COPYING STORED IMAGE DATA

(75) Inventors: Katsuyuki Teranishi; Yoshihisa Tanaka, both of Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 09/587,978

(22) Filed: Jun. 6, 2000

(30) Foreign Application Priority Data

Jun. 21, 1999 (JP) .................................................. 11-173924

(51) Int. Cl.[7] .................................................... G03G 15/00
(52) U.S. Cl. .................................. 399/82; 399/81; 399/83
(58) Field of Search .................................. 399/82, 83, 81; 358/444, 448

(56) References Cited

U.S. PATENT DOCUMENTS

| | | | |
|---|---|---|---|
| 5,253,077 | * 10/1993 | Hasegawa et al. | 358/444 X |
| 5,563,986 | * 10/1996 | Suzuki | 358/448 X |
| 5,614,993 | * 3/1997 | Smith et al. | 399/81 |

FOREIGN PATENT DOCUMENTS

| | | | |
|---|---|---|---|
| 1-144130 | * 6/1989 | (JP) . |
| 5-150957 | * 6/1993 | (JP) . |
| 7-177323 | * 7/1995 | (JP) . |

* cited by examiner

*Primary Examiner*—Susan S. Y. Lee
(74) *Attorney, Agent, or Firm*—Smith, Gambrell & Russell, LLP

(57) ABSTRACT

The present invention relates to an image forming apparatus capable of reading out an image from stored data, after an image forming job has been executed, and copying the image data onto a copy paper. The apparatus reads image data on a document, stores the image data in a memory, and thereafter copies the image data stored in the memory on copy paper. The apparatus employs an operation mode switching key for switching between a normal mode and a re-output mode. Image data corresponding to a job which has been stored most recently in the memory is read out to copy the image data read out on a copy paper. This occurs when a start key is operated while the apparatus is in the re-output mode, as selected by an operation mode switching key.

8 Claims, 7 Drawing Sheets

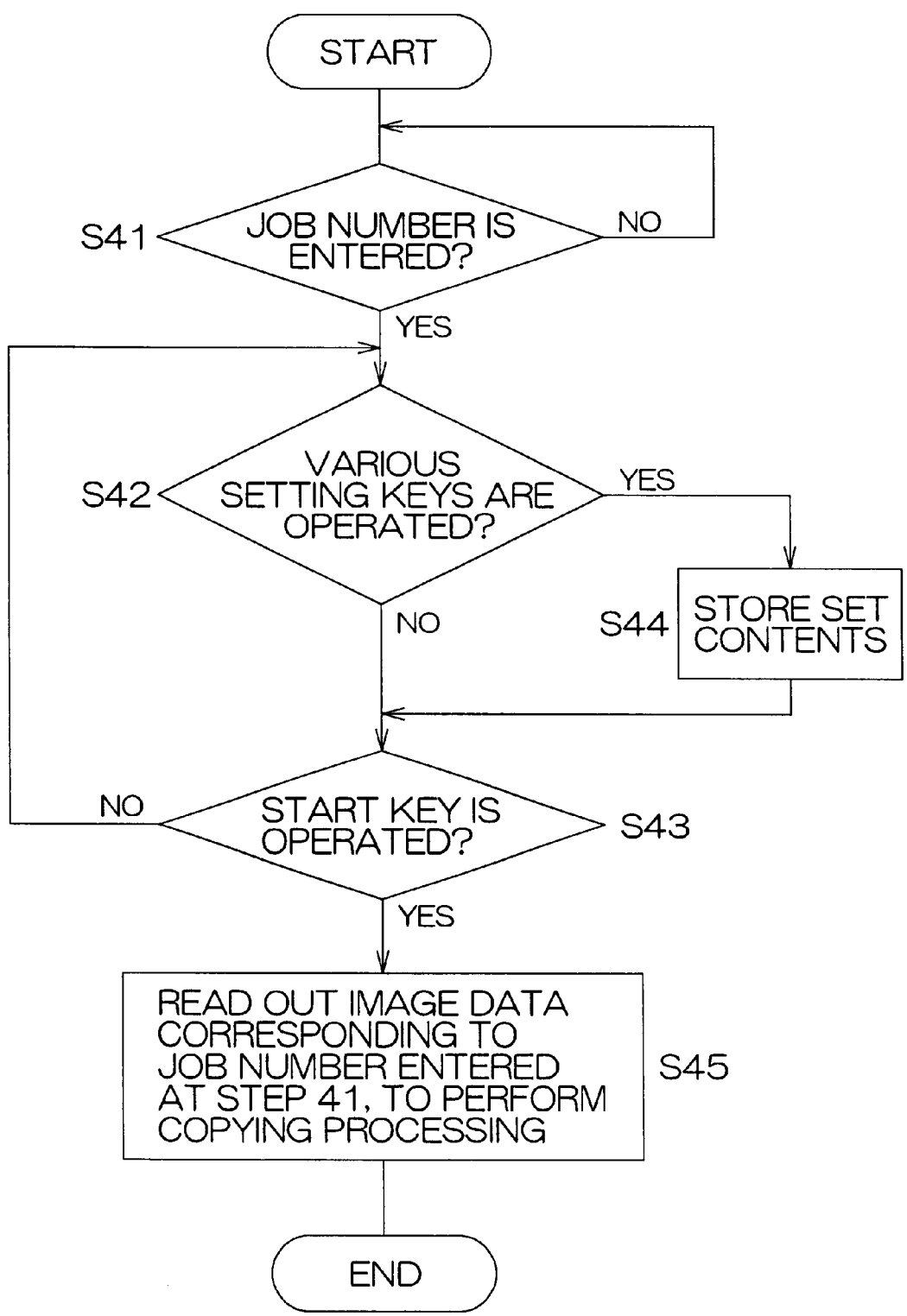

IMAGE FORMING APPARATUS FOR COPYING STORED IMAGE DATA

This application is based on an application No. 11-173924 filed in Japan, the content of which is incorporated hereinto by reference.

BACKGROUND OF THE INVENTION

1. Field of the Invention

The present invention relates to image forming apparatuses.

2. Description of Related Art

In an image forming apparatus such as a digital copying machine, a series of document data read by a reader is stored as jobs in a memory, is then read out from the memory, and is copied on a copy paper. Once the job is read out, and document data which is its contents is copied on a copy paper(this is referred to as "the job is executed"), the job stored in the memory cannot be read out again and copied on the copy paper. When it is desired to copy the contents of the job which has been executed in the past, the document data must be read again and stored as the job.

SUMMARY OF THE INVENTION

An object of the present invention is to provide an image forming apparatus capable of reading out, even after a job is executed, a job which is stored in storage means again, to copy image data of the job on a copy paper sheet.

The present invention is directed to an image forming apparatus comprising a reading mechanism for reading image data on a document; a memory for storing a series of image data read by the reading mechanism as jobs; a mode switching key for switching a normal mode and a re-output mode; and a start signal entry key, for reading out predetermined image data which has already been stored in the memory and copying the predetermined image data read out on a copy paper without reading the image data by the reading mechanism in response to entry of a start signal by the start signal entry key in a state where the re-output mode is set by the mode switching key.

According to the present invention, an image forming apparatus capable of re-outputting the image data stored in the storage means is obtained even after the job is executed.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 7 is a flow chart showing a fifth embodiment and showing the procedure for operations in a case where the operation mode is switched to a re-output mode.

DESCRIPTION OF PREFERRED EMBODIMENTS

By way of an example of an image forming apparatus, a digital copying machine of the present invention will hereinafter be described.

Figure 1:
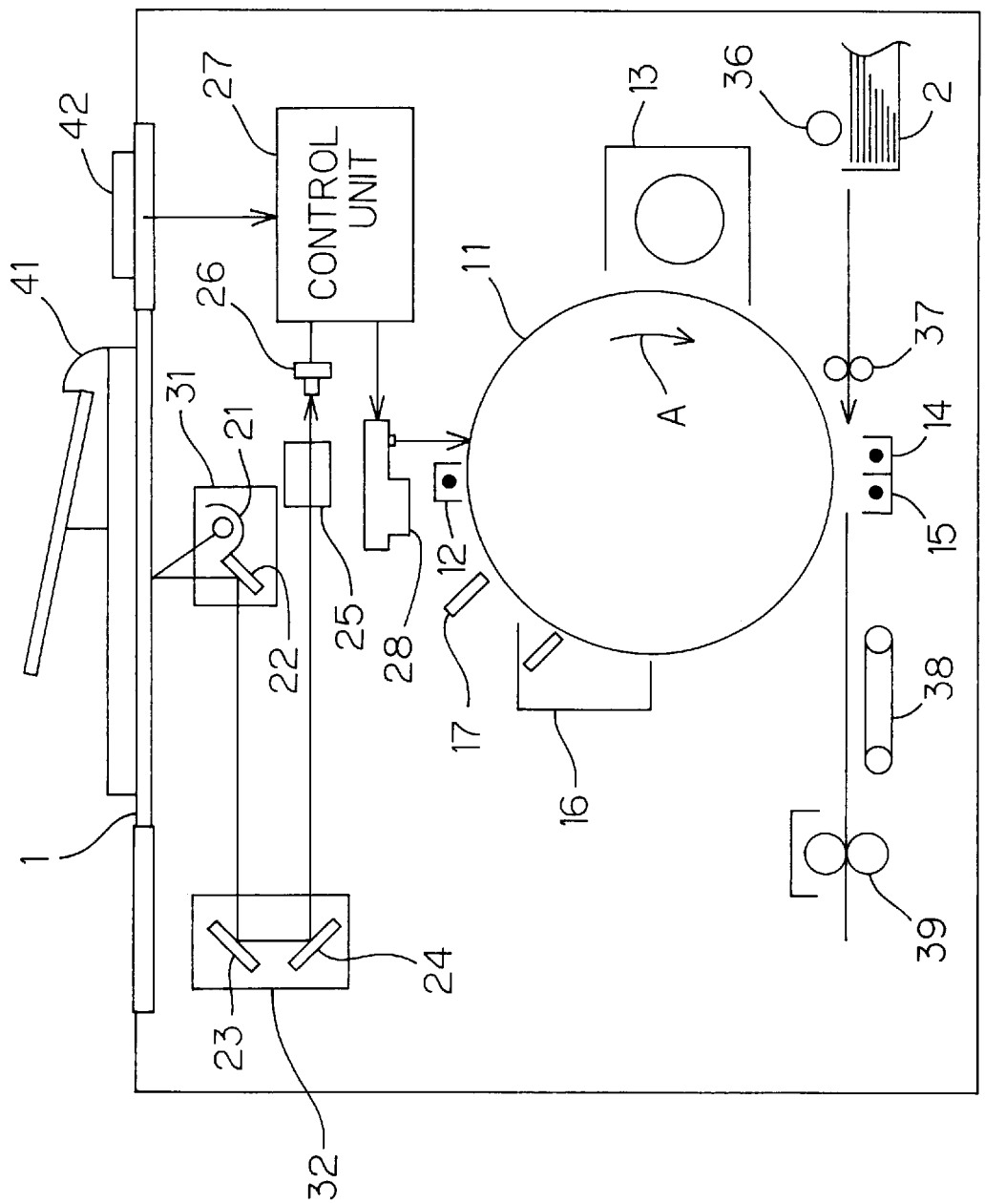
FIG. 1 is a schematic view showing the construction of an image forming apparatus.

FIG. 1 illustrates the configuration of a digital copying machine.

A transparent platen 1 on which a document to be copied is set is provided on the upper surface of the main body of the digital copying machine. An operation display section 42 is provided on the upper surface of the main body of the copying machine. An automatic document feeder (ADF) 41 is disposed on the transparent platen 1. A paper feeding cassette 2 is provided on one side of the main body of the copying machine. An exposure mechanism, a printing mechanism, and a copy paper conveying mechanism are provided inside the main body of the copying machine.

The exposure mechanism comprises a first optical system traveling member 31 comprising an exposure lamp 21 for exposing and scanning an image on the document (not shown) set on the transparent platen 1 and a first mirror 22 for reflecting light reflected from the document, a second optical system traveling member 32 comprising second and third mirrors 23 and 24 for introducing the light reflected by the first mirror 22 into a condensing lens 25, a solid-state image pick-up device 26 such as a CCD (Charge Coupled Device) for converting optical information obtained by the condensing lens 25 into an electric signal, a control unit 27 into which image data or the like obtained by the solid-state image pick-up device 26 is to be entered, and a laser unit 28 for converting the image data from the control unit 27 into an optical signal (laser light). A photosensitive drum 11 is irradiated with the laser light outputted from the laser unit 28.

The first optical system traveling member 31 and the second optical system traveling member 32 are moved back and forth in the lateral direction by a scan motor (not shown). The second optical system traveling member 32 moves a distance which is one-second the distance the first optical system traveling member 31 moves at a speed which is one-second the speed of the first optical system traveling member 31.

The printing mechanism comprises the photosensitive drum 11. The photosensitive drum 11 is rotated in a direction indicated by an arrow A by a main motor (not shown). Around the photosensitive drum 11, a charging corona discharger 12 for charging a photosensitive layer on a surface of the photosensitive drum 11, a developing device 13 for developing an electrostatic latent image formed on the photosensitive layer into a toner image, a transferring corona discharger 14 for transferring the toner image formed on the photosensitive layer to a copy paper, a separating corona discharger 15 for separating the copy paper from the photosensitive drum 11, a cleaning device 16 for removing toner particles remaining on the photosensitive drum 11 after the transfer, and a charge eliminator 17 for eliminating charges on the surface of the photosensitive drum 11 are disposed in this order.

The copy paper conveying mechanism comprises a paper feeding roller 36 for feeding the copy paper in the paper feeding cassette 2, a registration roller 37 for conveying the copy paper fed by the paper feeding roller 36 to the photosensitive drum 11 at predetermined timing, and a conveying belt 38 for conveying the copy paper having the toner image formed on the photosensitive drum 11 transferred thereon and stripped from the photosensitive drum 11 to a fixing roller 39. The copy paper which has been subjected to fixing processing by the fixing roller 39 is fed onto a discharge tray 43 through a discharge mechanism (not shown).

Figure 2:
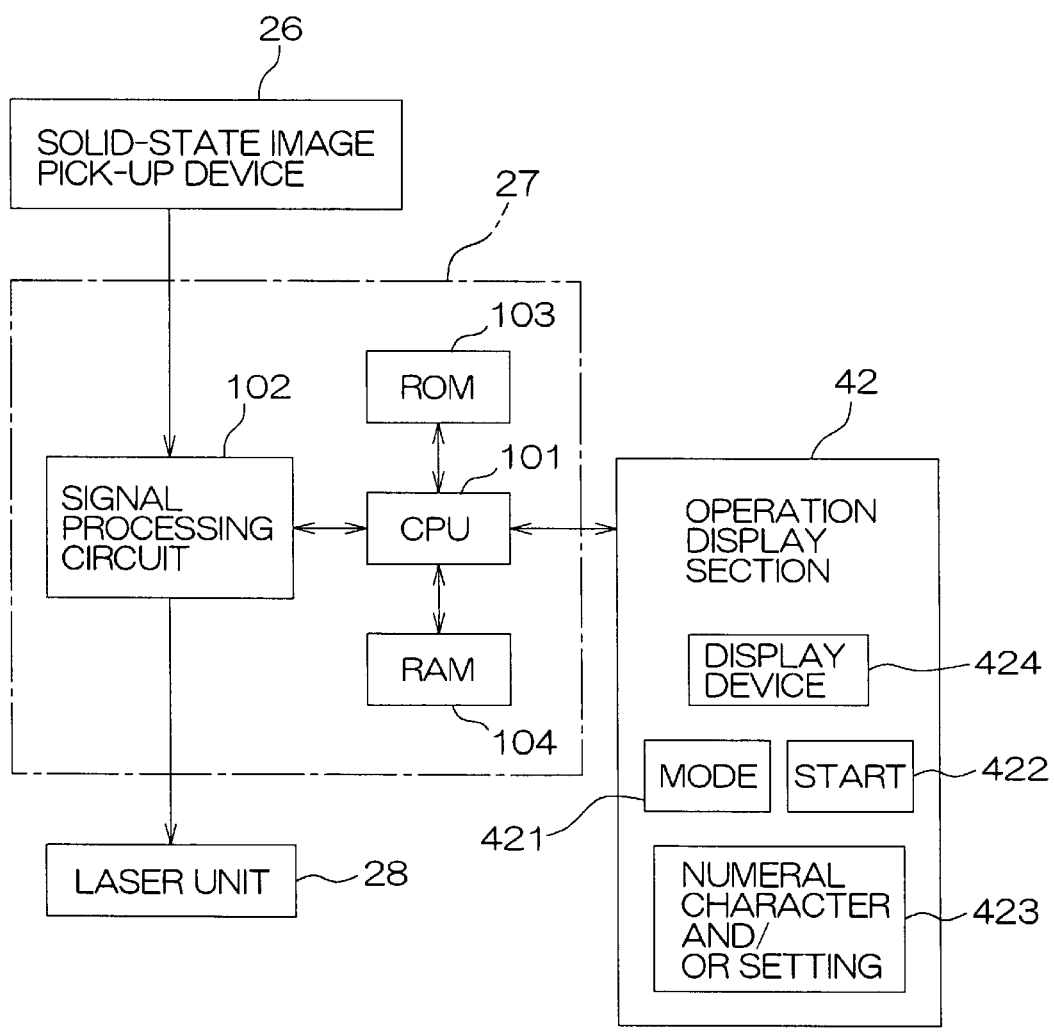
FIG. 2 is a block diagram showing the configuration of a control unit.

The control unit 27 comprises a CPU 101 and a signal processing circuit 102, as shown in FIG. 2. The CPU 101 comprises a ROM 103 storing its programs and so forth and a RAM 104 storing necessary data.

The signal processing circuit 102 subjects the image data obtained by the solid-state image pick-up device 26 to predetermined processing. Image data obtained by the signal processing circuit 102 is stored once in the RAM 104, is then read out, and is fed to the laser unit 28. The RAM 104 stores the image data in job units. That is, the image data is stored for each job number (job identification information).

An operation display section 42 is connected to the CPU 101 in the control unit 27 such that data can be transmitted. The operation display section 42 is provided with entry keys and setting keys which are required to enter various command signals and information, for example, a mode switching key 421, a start key 422, and a numeral, character and/or setting keys 423. The keys can be operated by a user. The mode switching key 421 is for switching the operation mode of the digital copying machine to a normal mode or a re-output mode. The start key 422 is for entering a copy start signal. The numeral, character and/or setting keys 423 are for entering a job number, described later, entering a retrieving character string, and entering, selecting and setting additional information such as the number of copies, the magnification, and the density.

The operation display section 42 further comprises a display device 424. The display device 424 is for displaying the procedure for operations required for copying, displaying additional information about jobs, and displaying other necessary information. The display device 424 may be a liquid crystal display device, a segment display device, or the like. When the display device 424 is the liquid crystal display device, the display device 424 may be used as an entry key by having a so-called touch-panel function.

Description is now made of a plurality of embodiments so adapted that the image data stored in the RAM 104 can be re-outputted.

[1] First Embodiment

Figure 3:
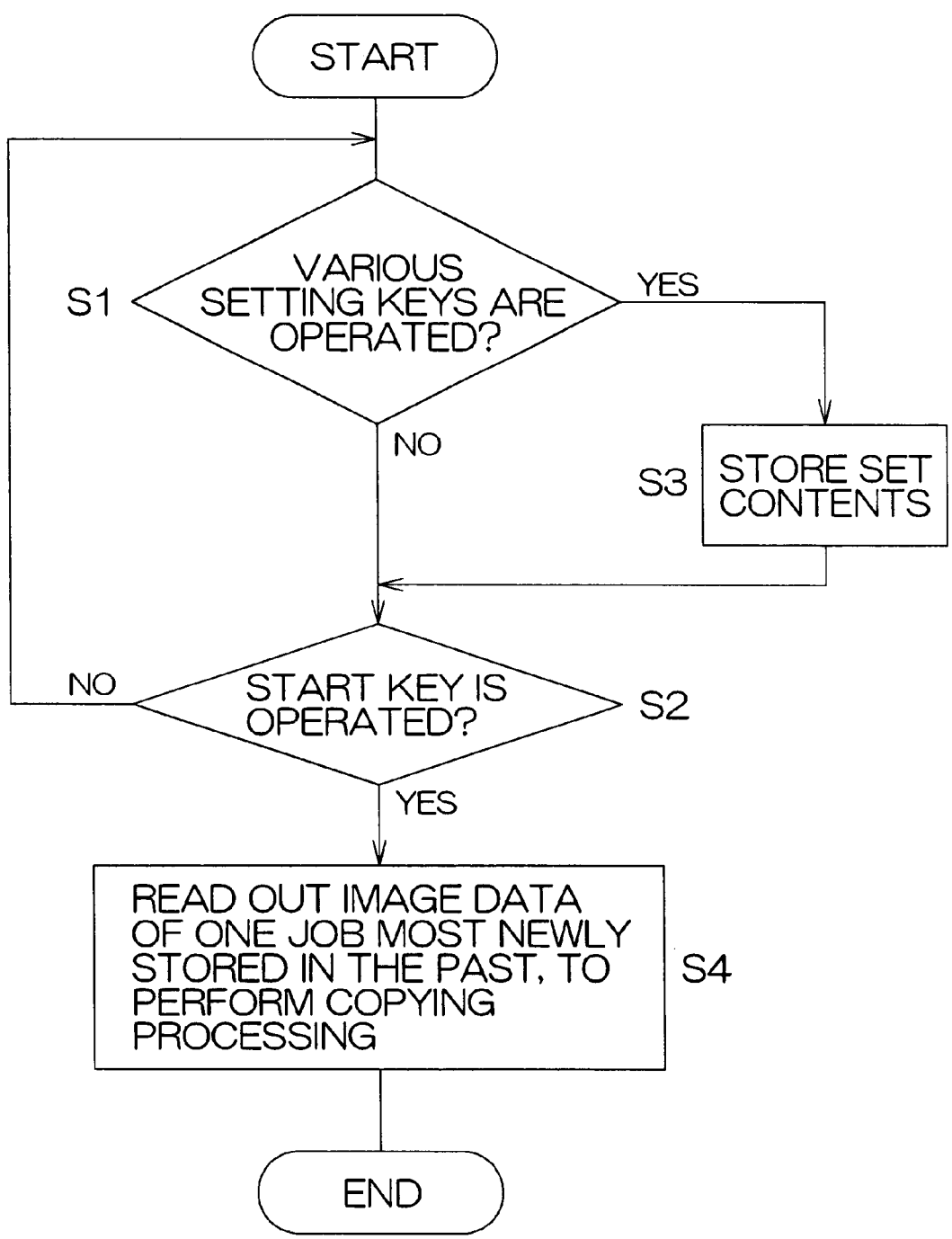
FIG. 3 is a flow chart showing a first embodiment and showing the procedure for operations in a case where the operation mode is switched to a re-output mode.

FIG. 3 shows operations in a case where the operation mode is switched to a re-output mode by the mode switching key 421.

When the operation mode is switched to the re-output mode, it is repeatedly judged whether or not the various setting keys (keys for setting the number of copies, the magnification, the density, etc.) 423 are operated (step S1), and whether or not the start key 422 is operated (step S2).

When the various setting keys 423 are operated, set contents are stored as additional information about a job (step S3). When the start key 422 is operated, image data of one job which has been most newly stored in the past in the RAM 104 is read out, so that copying processing is performed on the basis of the contents set as the additional information about the job (the number of copies, the magnification, etc.) (step 4).

When the various setting keys 423 are not operated at the step S1, so that the set contents are not stored as the additional information about the job, copying processing is performed on the basis of additional information which has been stored in a case where the job is stored in the RAM 104. That is, when the job has been stored in the RAM 104 in the past, the additional information about the job (the number of copies, the magnification, etc.) is also together stored. Accordingly, the number of copies, the magnification, and so forth are determined on the basis of the stored additional information, so that image information is copied. On the other hand, when it is desired to change the number of copies, the magnification, and so forth, the various setting key 423s are operated at the step S1. Therefore, the image information to be copied is the image information of the job read out. However, the number of copies, the magnification, and so forth are as set at the step S3.

In a case where the operation mode is the re-output mode, the operation mode is changed into a normal mode when the mode switching key 421 is operated.

[2] Second Embodiment

In a second embodiment, image data are stored for each job in a RAM 104, and additional information about the job is stored. The additional information includes the number of documents, the set number of copies, the set magnification, the set density, the job execution time, and so forth.

Figure 4:
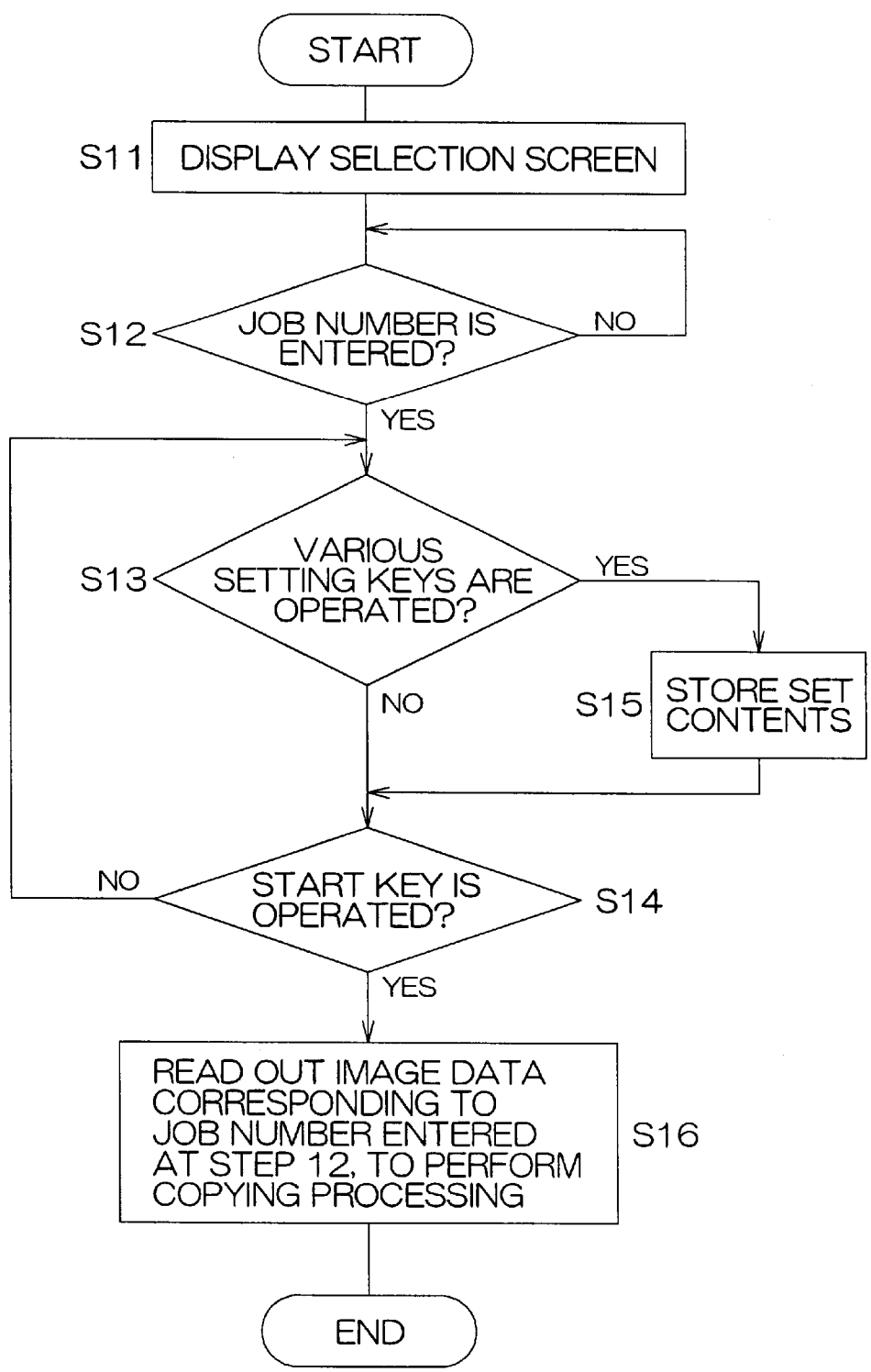
FIG. 4 is a flow chart showing a second embodiment and showing the procedure for operations in a case where the operation mode is switched to a re-output mode.

FIG. 4 shows operations in a case where the operation mode is switched to a re-output mode by the mode switching key 421.

When the operation mode is switched to the re-output mode, a selection screen for choosing which of the image data for the jobs stored in the RAM 104 should be re-outputted is displayed on the display device 424 (step S11).

On the selection screen, additional information is displayed for each of job numbers stored in the RAM 104. A user enters the job number corresponding to the image data to be re-outputted on the basis of the additional information.

When the user enters the job number (step S12), it is repeatedly judged whether or not the various setting keys (keys for setting the number of copies, the magnification, the density, etc.) 423 are operated (step S13), and whether or not the start key 422 is operated (step S14).

When the various setting keys 423 are operated, additional information is written to entered contents, and the entered contents are set (step S15). When the start key 422 is operated, the image data corresponding to the job number entered at the step S12 is read out of the RAM 104, so that copying processing is performed on the basis of the contents currently set (step S16).

In the case where the operation mode is the re-output mode, the operation mode is changed into a normal mode when the mode switching key 421 is operated.

[3] Third Embodiment

Figure 5:
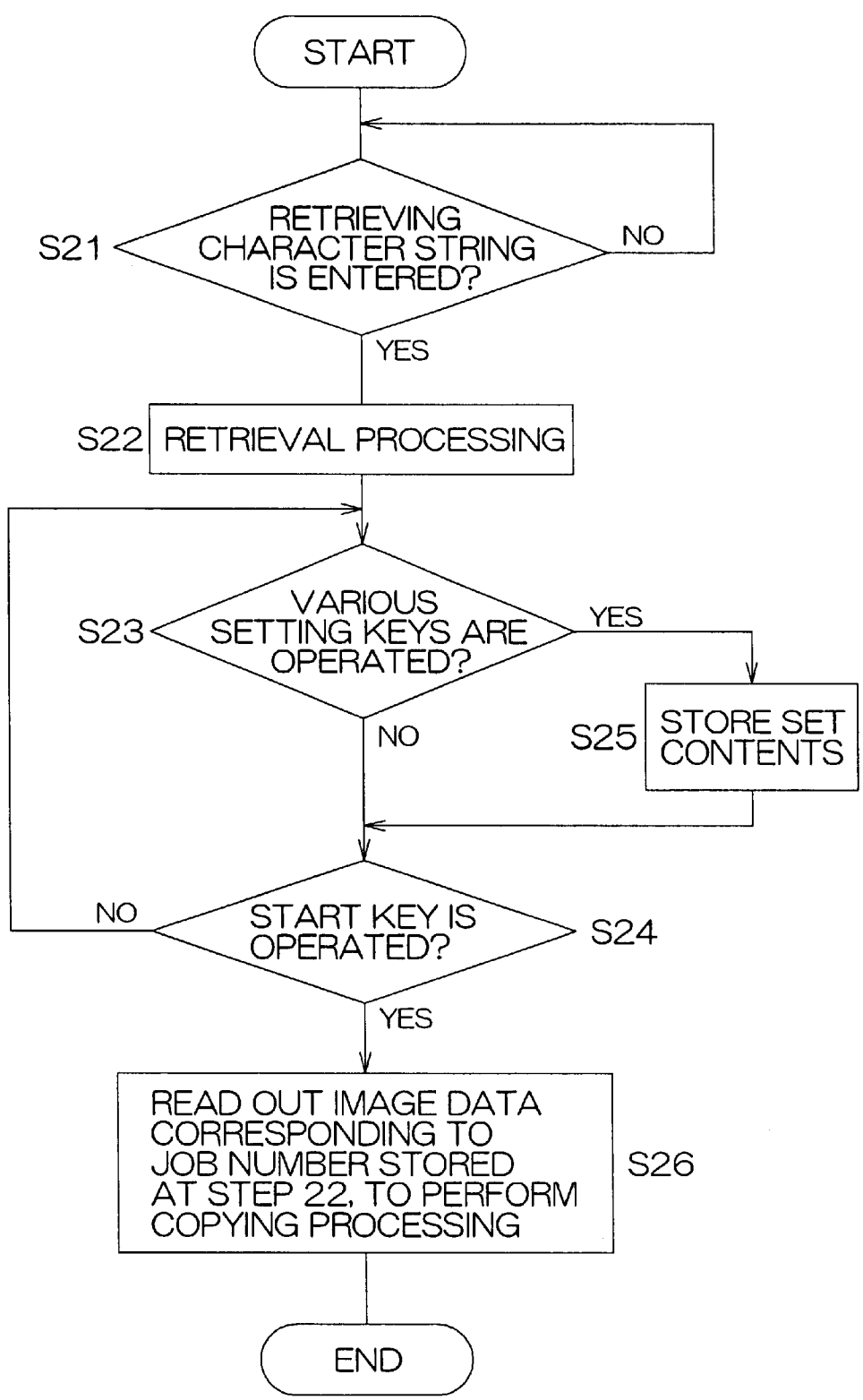
FIG. 5 is a flow chart showing a third embodiment and showing the procedure for operations in a case where the operation mode is switched to a re-output mode.

FIG. 5 shows operations in a case where the operation mode is switched to a re-output mode by the mode switching key 421.

When the operation mode is switched to the re-output mode, entry of a retrieving character string is waited for (step S21).

When the retrieving character string is entered by the retrieving character string entry key 423, a job having image data including a character string which coincides with the retrieving character string is retrieved out of jobs having image data stored in the RAM 104. When the job having the image data including the character string which coincides with the retrieving character string is found, the job number of the job is temporarily stored (step S22)

The job having the image data including the character string which coincides with the retrieving character string is retrieved in the following manner, for example. Specifically, the image data on the respective first pages of the jobs stored in the RAM 104 are read out for each job, to code characters included in the image data on the first page read out for the job. It is judged whether or not a code string which coincides with a code string corresponding to the retrieving character string is included, to judge whether or not the character string which coincides with the retrieving character string is included in the image data.

Thereafter, it is repeatedly judged whether or not the various setting keys (keys for setting the number of copies, the magnification, the density, etc.) 423 are operated (step S23), and whether or not the start key 422 is operated (step S24).

When the various setting keys 423 are operated, additional information about the job is rewritten to entered contents, and the entered contents are stored (step S25). When the start key 422 is operated, the image data corresponding to the job number stored at the step S22 is read out of the RAM 104, so that copying processing is performed on the basis of the contents currently set (step S26).

In the case where the operation mode is the re-output mode, the operation mode is changed into a normal mode when the mode switching key 421 is operated.

[4] Fourth Embodiment

A fourth embodiment is suitable for a case where a plurality of pages are included in a job which is desired to be performed again.

Figure 6:
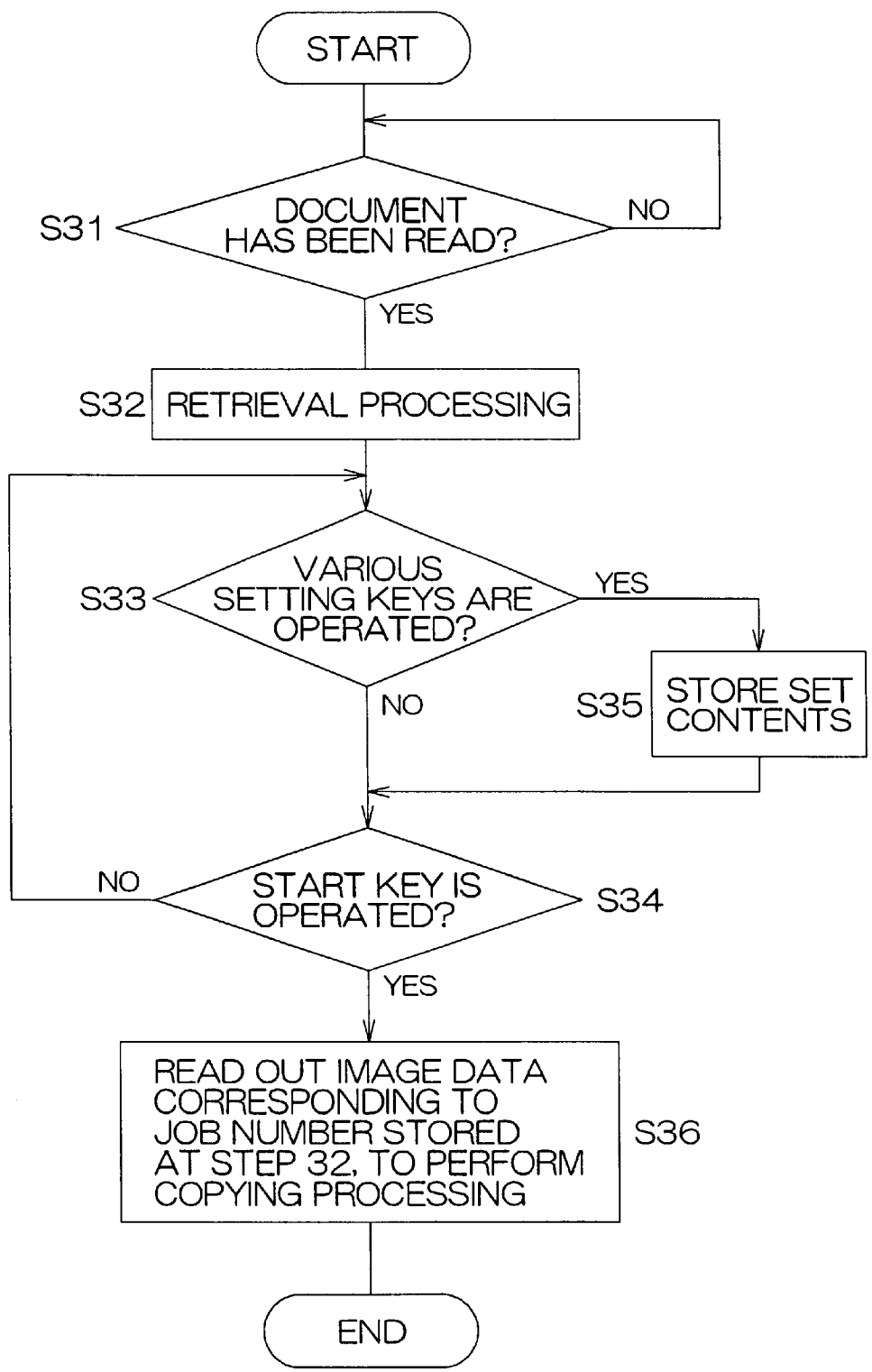
FIG. 6 is a flow chart showing a fourth embodiment and showing the procedure for operations in a case where the operation mode is switched to a re-output mode.

FIG. 6 shows operations in a case where the operation mode is switched to a re-output mode by the mode switching key 421.

When the operation mode is switched to the re-output mode, reading of a document having image data which is desired to be re-outputted is waited for (step S31).

When the plurality of pages are included in the job which is desired to be performed again, the first page or one arbitrary page out of the documents is set on the platen. The page set on the platen is read in response to pressing the start key 422, image data of each of jobs stored in the RAM 104 is compared with data representing the read page, and the job number of the job including the read page data is temporarily stored (step S32).

The job having the image data including the read first page data is retrieved in the following manner, for example. Specifically, the image data on the respective first pages of the jobs stored in the RAM 104 are read out for each job, to calculate similarity between the image data on the first page read out for the job and the read first page data. If the similarity is not less than a predetermined value, it is judged that the read first page data is included in the image data of the job.

Thereafter, it is repeatedly judged whether or not the various setting keys (keys for setting the number of copies, the magnification, the density, etc.) 423 are operated (step S33), and whether or not the start key 422 is operated (step S34).

When the various setting keys 423 are operated, additional information about the job is rewritten to entered contents, and the entered contents are set and stored (step S35). When the start key 422 is operated, the image data corresponding to the job number stored at the step S32 is read out of the RAM 104, so that copying processing is performed on the basis of the contents currently set (step S36).

In the case where the operation mode is the re-output mode, the operation mode is changed into a normal mode when the mode switching key 421 is operated.

[5] Fifth Embodiment

When a certain job is performed, the job number of the job is printed in a required portion of a copy paper on which a document image is to be printed, for example, the reverse surface of the copy paper.

FIG. 7 shows operations in a case where the operation mode is switched to a re-output mode by the mode switching key 421.

When the operation mode is switched to the re-output mode, entry of a job number is waited for (step S41).

A user can know the job number of a job which is desired to be executed again on the basis of the job number printed on the reverse surface of the copy paper which has been obtained by performing copying processing in the past. Accordingly, the job number of the job which is desired to be executed again is entered by the job number entry key 423.

When the job number is entered by the job number entry key 423, it is repeatedly judged whether or not the various setting keys (keys for setting the number of copies, the magnification, the density, etc.) 423 are operated (step S42), and whether or not the start key 422 is operated (step S43).

When the various setting keys 423 are operated, additional information about the job is rewritten, and set contents are stored (step S44) When the start key 422 is operated, image data corresponding to the job number entered at the step S42 is read out of the RAM 104, so that copying processing is performed on the basis of the contents currently set (step S45).

In the case where the operation mode is the re-output mode, the operation mode is changed into a normal mode when the mode switching key 421 is operated.

Although there has been described of the digital copying machine, the present invention is also applicable to various types of image forming apparatus such as a printer and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:

reading means for reading image data on a document;

storage means for storing image data read by the reading means as a job and storing a plurality of jobs;

mode switching means for switching said image forming apparatus between a normal mode and a re-output mode;

start signal entry means;

job designation signal entry means;

reading out means, responsive to entry of a job designation signal from the job designation signal entry means while said image forming apparatus is in the re-output mode as set by the mode switching means, for selecting the job corresponding to the job designation signal out of the jobs stored in the storage means and reading out the selected corresponding job; and copying means for copying the image data of the selected corresponding job read out by the reading means on a copy paper, without reading of image data by the reading means in response to entry of a start signal from the start signal entry means subsequent to the entry of the job designation signal; wherein the job designation signal entry means comprises means for entering a retrieving character string, and the reading means selects the job having the image data including a character string which coincides with the retrieving character string when the retrieving character string is entered.

2. The image forming apparatus according to claim 1, wherein the storage means can store job identification information, and the job designation signal entry means comprises means for entering the job identification information.

3. The image forming apparatus according to claim 2, further comprising recording means for recording the job identification information in a predetermined portion of the copy paper when the image data read out of the storage means is copied on the copy paper.

4. An image forming apparatus comprising:

reading means for reading image data on a document;

storage means for storing image data read by the reading means as a job and storing a plurality of jobs;

mode switching means for switching said image forming apparatus between a normal mode and a re-output mode;

start signal entry means;

job designation signal entry means;

reading out means, responsive to entry of a job designation signal from the job designation signal entry means while said image forming apparatus is in the re-output mode as set by the mode switching means, for selecting the job corresponding to the job designation signal out of the jobs stored in the storage means and reading out the selected corresponding job; and copying means for copying the image data of the selected corresponding job read out by the reading means on a copy paper without reading of image data by the reading means in response to entry of a start signal from the start signal entry means subsequent to the entry of the job designation signal; wherein the storage means can store additional information about the job, and has display means for displaying additional information about all the jobs stored in the storage means, and the job designation signal entry means comprises means for entering a signal for designating any of the additional information displayed on the display means.

5. The image forming apparatus according to claim 4, wherein the additional information about the job includes job identification information.

6. An image forming apparatus comprising reading means for reading image data on a document, storage means for storing image data read by the reading means as a job and storing a plurality of jobs, start signal entry means for entering a copy start signal, and copying means for reading out the job stored in the storage means and copying the image data of the job on a copy paper, comprising:

mode switching means for switching between a normal mode and a re-output mode;

means for causing said reading means to read a part of the document having the image data which is desired to be re-outputted in a state where the re-output mode is set by the mode switching means; and means for retrieving the job having the image data including the part of the read document out of the jobs stored in the storage means and reading out the retrieved job; and re-copying means for copying on the copy paper the image data of the job read out by the reading means in response to entry of the start signal from the start signal entry means.

7. An image forming apparatus comprising:

reading means for reading image data on a document;

storage means for storing image data read by the reading means as a job and storing additional information about the jobs;

mode switching means for switching between a normal mode and a re-output mode;

start signal entry means;

means for displaying a selection screen for choosing which of the jobs stored in the storage means is to be re-outputted in a state where the re-output mode is set by the mode switching means; and copying means for reading out, after the job is selected by a user on the basis of the selection screen displayed on the display means, the selected job from the storage means in response to entry of a start signal from the start signal entry means, and copying the image data of the job on a copy paper, additional information about the jobs being displayed for each of the jobs on the selection screen displayed on said display means.

8. The image forming apparatus according to claim 7, wherein the additional information about the jobs includes arbitrarily selected one of a number of documents, a set number of copies, set magnification, set density, and job execution time or an arbitrary combination thereof.

* * * * *